United States Patent
Hall, III et al.

(10) Patent No.: US 6,305,521 B1
(45) Date of Patent: Oct. 23, 2001

(54) HYDRAULICALLY ACTUATED PISTON WITH AN AIR BLEED

(75) Inventors: Arthur Hall, III, Cicero; Larry L. Witte, Danville, both of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/557,388

(22) Filed: Apr. 24, 2000

(51) Int. Cl.⁷ ..................................................... F15B 21/04
(52) U.S. Cl. ..................... 192/85 AA; 192/85 R; 92/79
(58) Field of Search ................. 192/85 AA, 85 R; 188/72.4, 71.5; 92/78, 79

(56) References Cited

U.S. PATENT DOCUMENTS 3,623,700 * 11/1971 Botsler ............................. 92/79 X
4,560,324 * 12/1985 Durieux ............................. 92/79 X
5,090,528 * 2/1992 Massel ............................. 192/85 R
6,029,447 * 2/2000 Stojic et al. ...................... 92/79 X

* cited by examiner

Primary Examiner—Charles A. Marmor
Assistant Examiner—Saúl Rodríguez
(74) Attorney, Agent, or Firm—Laura C. Hargitt

(57) ABSTRACT

A torque transmitting mechanism has a hydraulically actuated piston that is slidably disposed in a cavity. An apply chamber, formed by the piston and cavity, is filled with hydraulic fluid when the torque transmitting mechanism is to be engaged. One or more gas permeable—liquid impermeable mats are secured in a passage between the chamber and a non-liquid area in a transmission. During initial engagement of the torque transmitting mechanism, any entrapped air is forced out of the chamber through the mat while the leakage of liquid is inhibited. In a rotating torque transmitting mechanism (clutch), the mats are installed near the innermost periphery of the chamber. In a stationary torque transmitting mechanism (brake) the mats are installed near the top outermost periphery of the chamber.

4 Claims, 3 Drawing Sheets

HYDRAULICALLY ACTUATED PISTON WITH AN AIR BLEED

TECHNICAL FIELD

This invention relates to hydraulically actuated pistons for torque transmitting mechanisms and more particularly to such pistons having an air bleed structure.

BACKGROUND OF THE INVENTION

Torque transmitting mechanisms such as clutches and brakes employ a hydraulically operated piston to enforce frictional engagement between a plurality of friction plates that are alternately splined to a housing containing the piston and a hub member that is generally connected with a gear member. When the torque transmitting mechanisms are inactive during vehicle operation, a cavity or chamber formed between the piston and the housing remains filled with very low pressure oil. However, when the vehicle is stopped and the engine is not operated for a period of time, such as overnight, it is possible for the hydraulic fluid in the cavity to drain to the sump and the cavity becomes filled with air.

On a subsequent start-up of the vehicle, the air must be expelled from the cavity before consistent shift quality is attained. This may require five or more shift cycles which are objectionable. With today's electro-hydraulic controls, consistent hydraulic fluid fill times and volumes are necessary for shift quality consistency. The entrapped air in the cavity prevents the required consistency. The electronic controller of the electro-hydraulic control uses the data from the previous shift to calculate the optimum flow and pressurization rates to be employed during the current shift event. Since air is a compressible medium and hydraulic fluid is a relatively incompressible medium, if air is present in the cavity, it is difficult for the controller to determine the optimum flow and pressurization rates. During the first five or more shift events, the air is slowly bled from the cavity under the piston seals until the cavity is filled with hydraulic fluid only.

Some currently available power transmissions incorporating hydraulically operated torque transmitters utilize ball bleed valves and other such devices to provide a controlled passage through which the entrapped air can be evacuated. These devices often allow a significant amount of hydraulic fluid to leak from the cavity after the air bleed function is complete. The repeatability of these devices is inconsistent due to the variation in oil viscosity due to the operating temperature changes in the transmission.

SUMMARY OF THE INVENTION

It is an object of the present invention to provide an improved air bleed structure for the apply chamber of a torque transmitting mechanism.

In one aspect of the present invention, a hydrophobic material is secured in fluid communication between the apply chamber of a fluid operated torque transmitting mechanism and the interior of the transmission casing. In another aspect of the present invention, the hydrophobic material is disposed in either the piston or the housing of the torque transmitting mechanism. In yet another aspect of the present invention, a passage is provided between the apply chamber of a torque transmitter and the surrounding environment and a material permeable to vapor but substantially impermeable to liquid is secured in the passage.

Fluid operated disc type torque transmitting mechanisms can be either a rotating transmitter, such as a clutch, or a stationary transmitter, such as a brake. The entrapped air in a clutch is forced to the inner radius thereof as the clutch rotates since the heavier hydraulic fluid is centrifuged to the outer radius of the clutch. Therefore in a rotating torque transmitting mechanism, a vapor permeable-liquid impermeable material, such as a woven polytetrafluoroethylene (PTFE) is located in a passage at or near the inner radius of the clutch apply chamber. One such product found to be applicable to this environment is marketed by PALL Specialty Materials under the trademark Hydrolon®.

Generally, during the first engagement of the clutch after an idle period, entrapped air will have to be evicted from the clutch apply chamber. The air will be forced radially inwardly by the incoming hydraulic fluid and pass through the PTFE into the interior of the transmission from which it can be vented to atmosphere.

In a brake, the PTFE material is located in a passage formed at or near the top of the outer radius of the apply chamber. As the brake is applied, hydraulic fluid will force any entrapped air to the outer periphery of the brake apply chamber. The PTFE material will allow the air to escape to the interior of the transmission housing but prevent the leakage of any significant amount of hydraulic fluid. While the initial engagement of the clutch or brake may be slightly objectionable, after the entrapped air is evacuated, subsequent engagements of the brake or clutch will be within the desired design specifications for performance and pleasability.

DESCRIPTION OF EXEMPLARY EMBODIMENTS

Figure 1:
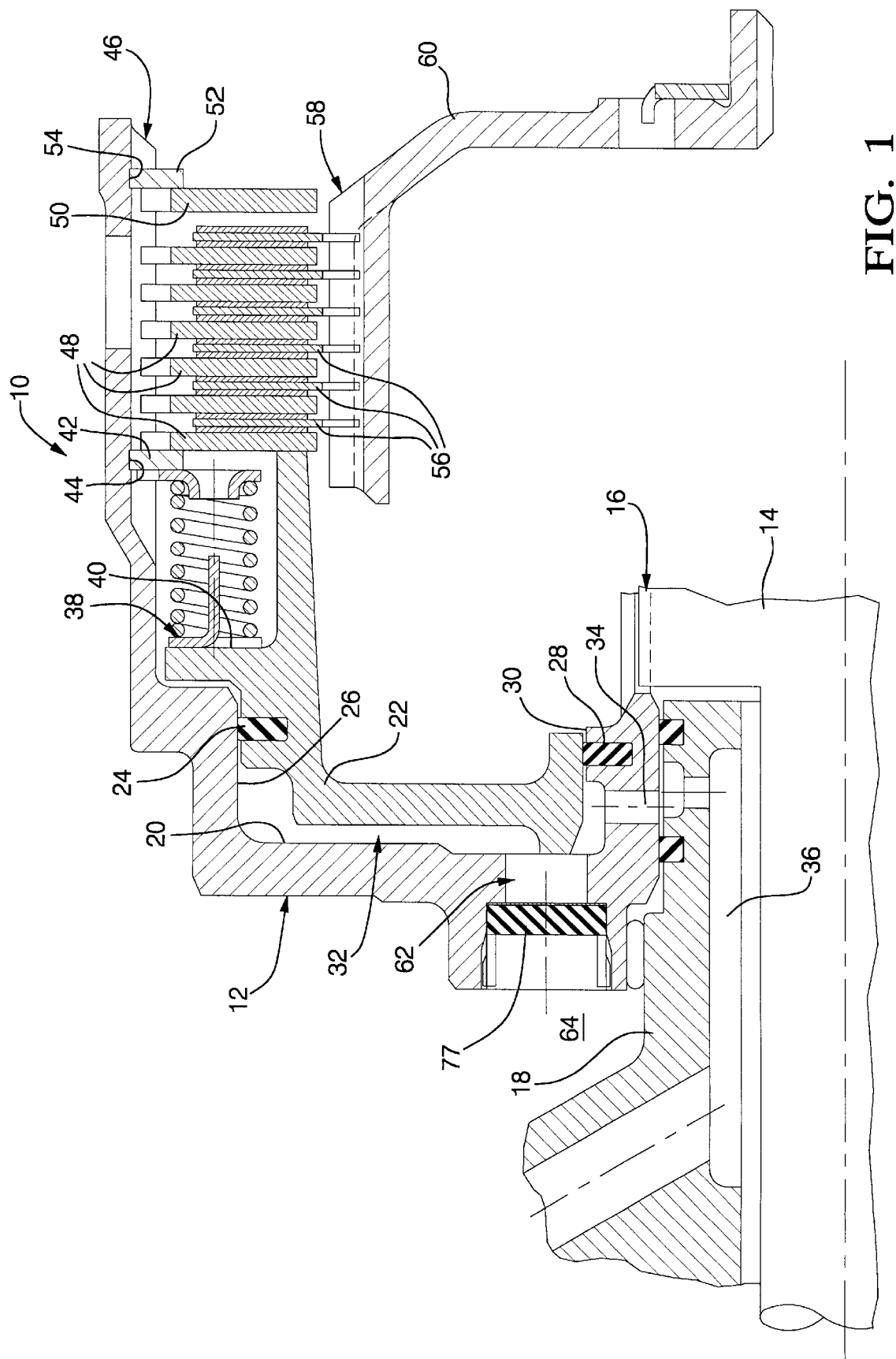
FIG. 1 is a sectional elevational view of a torque transmitting mechanism incorporating the present invention.

A rotating torque transmitter or clutch 10, FIG. 1, which is a member in a power transmission, not shown, has a housing 12 drivingly connected with an input shaft 14 through a spline connection 16. The housing 12 is rotatably mounted on a support sleeve 18 which may be part of a pump housing, not shown. The housing 12 has an annular cavity 20 in which is slidably disposed a piston 22. The piston 22 has a seal 24 which sealingly engages an outer periphery 26 of the cavity 20. An annular seal 28 that is disposed in an inner periphery 30 of the cavity 20 sealingly engages the piston 22. The piston 22, cavity 20 and seals 24 and 28 cooperate to form an apply chamber 32 for the clutch 10. The chamber 32 is in selective hydraulic fluid communication with a conventional pressure source and control, not shown, through a passage 34 in the housing 12 and a passage 36 in the support sleeve 18 when engagement of the clutch 10 is requested.

A return spring assembly 38 is disposed between a wall 40 on the piston 22 and a locking ring 42 secured in a groove 44 in the housing 12. The return spring assembly 38 is effective to urge the piston 22 leftward when the chamber 32 is not pressurized. A conventional ball dump valve mechanism, not shown, may be included to prevent centrifugal drift-on of the clutch 10.

The housing 12 has a spline portion 46 in which is rotatably, drivingly engaged a plurality of friction plates 48 and a reaction plate 50. The reaction plate 50 is limited in rightward movement by a locking ring 52 secured in a groove 54 formed in the spline portion 46. Alternatingly spaced with the friction plates 48 is a plurality of friction plates 56 that are rotatably, drivingly connected with a spline 58 formed on an output hub 60. The output hub 60 is drivingly connected with a gear or other transmission member, not shown, in a conventional manner. When the apply chamber 32 is pressurized, the piston 22 will move rightward to enforce frictional engagement between the friction plates 48 and the friction plates 56 to provide a torque transmitting path between the shaft 14 and the hub 60.

Figure 2:
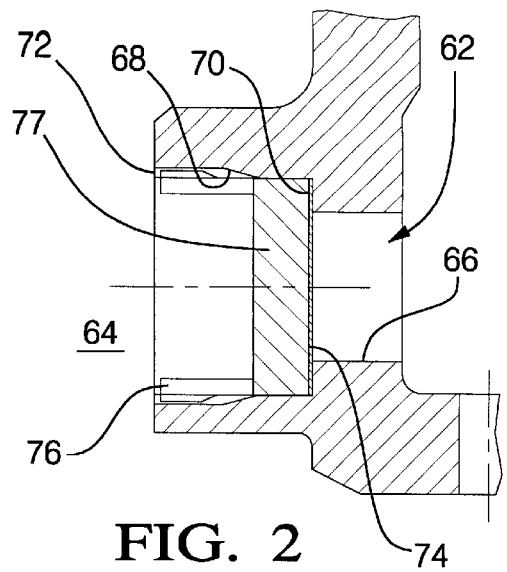
FIG. 2 is an enlarged view of a portion of FIG. 1.

The housing 12 has an opening or passage 62, FIG. 2, which communicates between the apply chamber 32 and an interior portion 64 of the transmission. The opening 62 has a first bore portion 66 and a second bore portion 68 which is larger in diameter than the first bore 66 such that an annular shoulder 70 is formed in the opening 62. The second bore 68 has a threaded outer surface 72. A gas permeable—liquid impermeable mat 74 is disposed in the second bore 68 and held against the shoulder 70 by an annular plug 76 that is threaded into the bore 68 against a permeable or porous metal support 77. The mat 74 is preferably a polytetrafluoroethylene (PTFE) material with a polyester cloth bonded to the surface adjacent the shoulder 70. One such material is marketed as Hydrolon® PTFE by Pall Specialty Materials. While only one passage 62 and mat 74 are shown, a plurality of such assemblies can be spaced about the inner periphery of the housing 12.

When the transmission is inactive for extended periods, such as overnight, the residual hydraulic fluid in the chamber 32 can drain to the transmission sump and be replaced by air. When the vehicle is placed in operation following the inactive period, the actuation of the clutch will be less pleasable than expected by the operator until the air in the chamber 32 is expelled. During the first engagement of the clutch 10, the rotation of the clutch housing 12 will force the hydraulic fluid entering the chamber 32 radially outwardly thereby forcing the entrapped air inwardly. The mat 74 will permit the entrapped air to escape to the interior portion 64. If the clutch is engaged for an extended period, after the initial engagement, the air will be expelled during the first engagement. If a ratio change occurs in the transmission prior to all of the air being expelled, two or more cycles may be needed, however this will be less than the currently available systems require.

Figure 3:
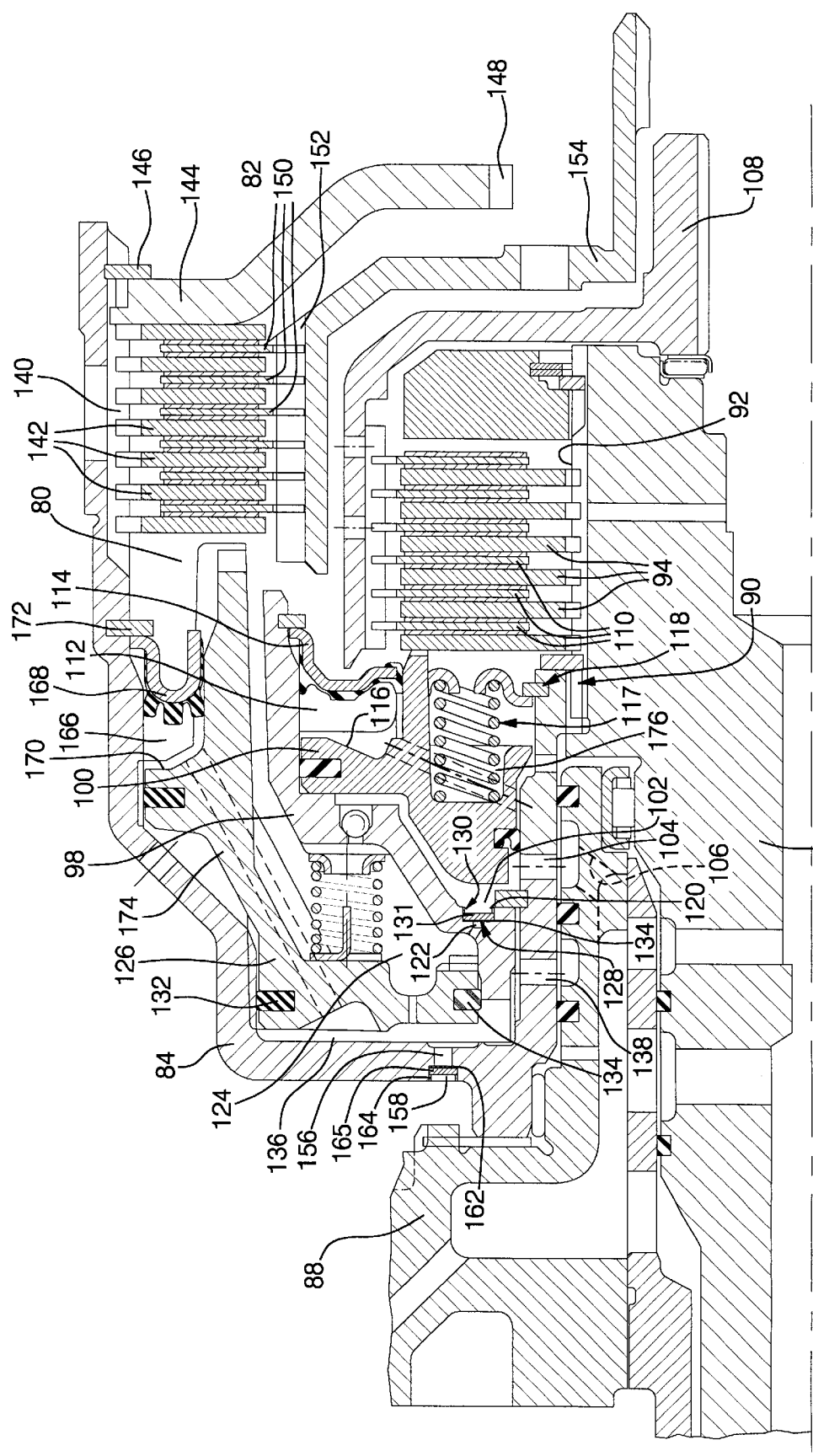
FIG. 3 is a sectional elevational view of nested torque transmitting mechanisms incorporating the present invention.

In FIG. 3 a pair of nested rotating torque transmitting mechanisms or clutches 80 and 82 are shown. The clutch 82 is radially inward of the clutch 80. The clutch 80 has a housing 84 which is rotatably mointed on a sleeve support 86. The housing 84 is drivingly connected with an input shaft 88 through a spline connection 90. The input shaft 88 also has a spline portion 92 that drivingly engages a plurality of friction plates 94 and a reaction plate 96 that are slidably disposed thereon. The housing 84 has an inner housing 98 secured therein. A piston 100 is slidably disposed in the housing 98. The piston 100 and the housing 98 cooperate to form an apply chamber 102 which is in hydraulic fluid communication with a conventional transmission control through passages 104 and 106.

The clutch 82 includes an output hub 108 with a plurality of friction plates 110 slidably disposed thereon in alternating arrangement with the friction plates 94. A centrifugal balance chamber 112 is formed by a dam 114, the housing 98 and a wall 116 of the piston 100. A return spring assembly 117 is disposed between a locking ring 118, secured to the housing 84, and the piston 100 to urge the piston 100 to a disengaged position. Hydraulic fluid pressure in the chamber 102 will cause the piston to move rightward thereby enforcing engagement between the friction plates 94 and 110 to complete a torque transmitting connection between the input shaft 88 and the output hub 108.

The housing 98 has a first bore 120 and a second bore 122 that provide communication between the chamber 102 and a low pressure space 124 between the housing 98 and a piston 126 of the clutch 80. A gas permeable—liquid impermeable mat 128 is secured in the bore 120 by a threaded member 130 and a porous metal backing member 131. The mat 128 is constructed similar to the mat 74 to permit the expulsion of entrapped gas from the chamber 102.

The piston 126 of the clutch 80 is slidably disposed in the housing 84. A pair of annular seals 132, 134 cooperate with the piston 126 and the housing 84 to form an apply chamber 136 which is in hydraulic fluid communication with the transmission control thorough a passage 138. The housing 84 has a spline portion 140 in which is slidably disposed a plurality of friction plates 142 and a combination backing/transfer plate 144. The plate 144 is secured in the housing 84 by a locking ring 146. The plate 144 has a spline 148 adapted to connect with further input members downstream of the clutch 80. A plurality of friction plates 150 are slidably disposed on and drivingly connected with a spline 152 formed on an output hub 154 which is connected with other transmission members such as gears, not shown.

The housing 84 has a first bore 156 and a second bore 158 that are interconnected to provide communication between the chamber 136 and a low pressure space 160. A gas permeable—liquid impermeable mat 162 is secured in the bore 158 by a threaded member 164 and a porous metal member 165. The construction of the bore 158, threaded member 164, porous metal member and mat 162 are similar to the structure of the components described in FIGS. 1 and 2. The mat 162 will permit the escape of entrapped air from the chamber 136 while significantly restricting the leakage of hydraulic fluid. As with the clutch described in FIG. 1, the air will be expelled during the first engagement of the clutches 80 and 82 unless a ratio change is incurred shortly after the initial engagement such that sufficient time is not available to completely exhaust the air from the chambers 102 and 136. However, on the subsequent engagement of the clutch 80 or 82, the air will generally be fully exhausted.

The clutch 80 also has a centrifugal pressure balance chamber 166 formed between the housing 84 and the piston 126. The chamber is formed by an annular dam 168 and an annular end wall 170 of the piston 126. The dam 168 is secured in the housing 84 by a locking ring 172. The balance chamber 166 is supplied with fluid from the chamber 136 through a passage 174. The fluid in the balance chamber 166 counteracts the centrifugal forces in the chamber 136 whenever hydraulic fluid is present in the chamber 136. The balance chamber 112 is supplied with hydraulic fluid from the lube circuit through a passage 176. The hydraulic fluid in the balance chamber 112 will balance the centrifugal forces generated in the chamber 102. The chamber 102 may also be provided with a conventional ball dump valve to assist in counteracting the centrifugal forces when the clutch 82 is disengaged.

Figure 4:
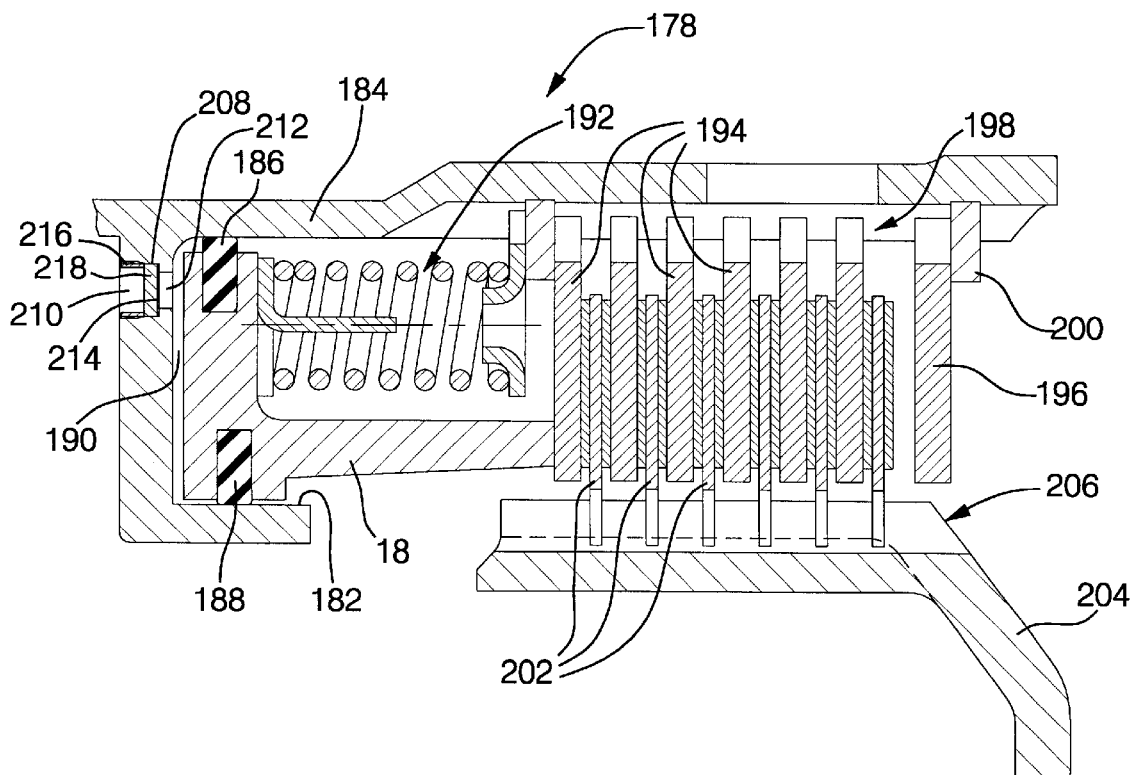
FIG. 4 is a sectional elevational view of a stationary torque transmitting mechanism incorporating the present invention.

A stationary torque transmitting mechanism or brake 178 is shown in FIG. 4. The brake 178 has a piston 180 slidably disposed in an annular cavity 182 formed in a transmission housing 184. The piston 180 has assembled therewith a pair of annular seals 186 and 188 that cooperate with the cavity 182 to form an annular apply chamber 190. A return spring assembly 192 is placed between the housing 184 and the piston 180 to urge the piston 180 leftward, as viewed in FIG. 4, to a disengaged position. Fluid pressure is supplied to the chamber 190 to urge the piston 180 rightward toward an engaged position. A plurality of friction plates 194 and a backing plate 196 are connected with the housing 184 through a spline 198. The backing plate 196 is restrained from rightward movement by a locking ring 200. A plurality of friction plates 202 are alternated with the friction plates 194 and connected with an output hub 204 through a spline 206. The output hub 204 is connected with a gear member, not shown, to restrain rotation thereof when required by the operation of the transmission.

The housing 184 has a stepped bore 208 comprised of a large diameter portion 210 and a small diameter portion 212 formed near the top thereof. A PTFE mat 214 is secured in the large diameter portion by a threaded fastener 216 and porous metal backing member 218 in a manner similar to that shown in FIG. 2. The small diameter portion 212 communicates with the apply chamber 190 near the top outer periphery thereof. The large diameter portion 210 communicates with the interior of the housing 184 to provide a gas permeable—liquid impermeable passage between the apply chamber 190 and the interior of the housing 184. When the chamber 190 is initially pressurized after an extended period of vehicle shut down, air, which has collected in the chamber 190, will be forced by the incoming hydraulic fluid to the top outer periphery of the chamber 190 and exhausted through the mat 214 to the interior of the housing 184. If the brake 178 is engaged for an extended period during the initial engagement, all of the air will be exhausted during this period, however is the engagement period is short, during a quick ratio change, it may require two or perhaps three engagements of the brake 178 to fully exhaust the air from the chamber 190.

While the above exemplary embodiments depict one vent opening per cavity, those skilled in the art will recognize that a plurality of such vents can be used in each cavity.

What is claimed is:

1. A torque transmitting mechanism comprising:
    a housing;
    a selectively pressurized fluid cavity formed in said housing;
    a piston slidably disposed in said cavity and cooperating therewith to form a fluid chamber, said chamber being pressurized with hydraulic fluid to axially move said piston to selectively engage the torque transmitting mechanism;
    a passage communicating between said chamber and a location exterior to said chamber; and
    a gas permeable mat secured in said passage to permit the passage of gas from said chamber to said location exterior to said chamber.

2. The torque transmitting mechanism defined in claim 1 further comprising:
    said housing being a rotatable member;
    said chamber being annular and having an inner periphery and an outer periphery; and
    said passage being located nearer said inner periphery than said outer periphery of said chamber.

3. The torque transmitting mechanism defined in claim 1 further comprising:
    said housing being a stationary member;
    said chamber being annular and having an inner periphery and an outer periphery; and
    said passage being located nearer a top portion of said outer periphery than said inner periphery of said chamber.

4. A torque transmitting mechanism comprising:
    a housing;
    a selectively pressurized fluid chamber formed in said housing;
    a piston slidably disposed in said chamber to selectively engage the torque transmitting mechanism when said chamber is pressurized;
    a passage communicating between said chamber and a location exterior to said chamber and having a shoulder portion;
    a gas permeable mat positioned against said shoulder portion in said passage to permit the passage of gas from said chamber to said location exterior to said chamber; and
    means including a porous metal body for securing said, as permeable mat in location against said shoulder.

* * * * *